United States Patent [19]

Rich

[11] 4,404,425
[45] Sep. 13, 1983

[54] CABLE ASSEMBLY FOR UNDERCARPET SIGNAL TRANSMISSION

[75] Inventor: Donald S. Rich, Long Valley, N.J.

[73] Assignee: Thomas & Betts Corporation, Raritan, N.J.

[21] Appl. No.: 213,311

[22] Filed: Dec. 5, 1980

[51] Int. Cl.³ .............................................. H01B 7/08
[52] U.S. Cl. .................................. 174/107; 174/70 C; 174/97; 174/117 F; 174/117 A
[58] Field of Search ...................... 174/10, 68 R, 68 C, 174/70 C, 72 C, 97, 103, 104, 107, 115, 117 R, 117 A, 117 F

[56] References Cited

U.S. PATENT DOCUMENTS

| | | | |
|---|---|---|---|
| 2,595,452 | 5/1952 | Geist et al. | 174/117 F X |
| 2,636,520 | 4/1953 | Geist et al. | 174/70 C X |
| 2,831,049 | 4/1958 | Cabral | 174/117 A |
| 2,932,687 | 4/1960 | Cook | 174/97 X |
| 2,963,676 | 12/1960 | Sneesby et al. | 174/70 C X |
| 3,029,303 | 4/1962 | Severino | 174/97 |
| 3,118,017 | 1/1964 | Wimbish | 174/97 |
| 3,748,371 | 7/1973 | Krook et al. | 174/10 X |
| 3,775,552 | 11/1973 | Schumacher | 174/117 F X |
| 3,812,282 | 5/1974 | Johansson | 174/10 X |
| 3,949,156 | 4/1976 | Niimura et al. | 174/10 X |

FOREIGN PATENT DOCUMENTS

| | | | |
|---|---|---|---|
| 255520 | 7/1967 | Austria | 174/115 |
| 1072060 | 3/1954 | France | 174/97 |
| 1304739 | 8/1962 | France | 174/70 C |
| Ad.87126 | 5/1966 | France | 174/117 A |
| 215873 | 5/1924 | United Kingdom | 174/117 A |
| 757357 | 9/1956 | United Kingdom | 174/97 |

*Primary Examiner*—Laramie E. Askin
*Attorney, Agent, or Firm*—Robert M. Rodrick; Salvatore J. Abbruzzese; Jesse Woldman

[57] ABSTRACT

An undercarpet cable assembly for use in signal transmission systems has a coaxial cable subassembly retained by but strippable from an abrasion-protective and crush-resistant resilient retention body. Stripping is facilitated by an unbonded relation between the subassembly and the retention body.

16 Claims, 7 Drawing Figures

CABLE ASSEMBLY FOR UNDERCARPET SIGNAL TRANSMISSION

FIELD OF THE INVENTION

This invention relates to electrical cable assemblies and pertains more particularly to cable assemblies for use as undercarpet signal transmission cables.

BACKGROUND OF THE INVENTION

With the recent commercialization of the FCC (flat conductor cable) power distribution system for installation under carpet tiles, need has arisen for an accompanying undercarpet signal transmission system for connection to digital data terminals situtated in rooms serviced by the power distributions system. Such terminals are typically interconnected through protective raceways by coaxial cables in present widespread commercial use.

In the undercarpet environment, the customary raceway or ductwork for cable routing and protection found in traditional electrical power distribution and signal transmission systems is not present. Accordingly, the undercarpet environment provides a potential for mechanical abuse of cables above and beyond that seen in the prior systems, e.g., through pedestrian movement, furniture placement and movement, rolling carts, etc., particularly during system installation and before tiles are laid down. A further aspect of the undercarpet environment is a concern for aesthetics of installation. Thus, commercially available coaxial cable which might tolerate the mechanical abuse has a height profile exceeding that required for unobtrusive installation. In a still further aspect, convenience of undercarpet transmission system installation imposes need for ready release of the coaxial cable from any protective raceway.

To the extent that artisans have heretofore addressed the subject of protective placement of wiring directly upon exposed concrete and beneath carpeting, as evidenced, for example, in U.S. Pat. Nos. 2,595,452 and 2,636,520, the efforts have not provided a cable assembly suited for the foregoing and other needs of undercarpet signal transmission systems.

SUMMARY OF THE INVENTION

The present invention has as its object the provision of cable assemblies satisfying the requirements of undercarpet signal transmission systems.

In attaining the foregoing and other objects, the invention provides a cable assembly wherein a subassembly of a coaxial cable, a drain wire and a conductive sheath is disposed within a protective body of electrically insulative material, the body being contiguous with and imposing radial constraint upon the cable subassembly throughout its length while permitting ready release of the subassembly for connection purposes. The cable assembly is contained film-wise at the floor of the body in a particularly preferred embodiment of the invention whereby it may be readily stripped from the body for terminating purposes.

The foregoing and other features of the invention will be further evident from the following detailed description of preferred embodiments thereof and from the drawings wherein like reference numerals are used to identify like parts throughout.

DESCRIPTION OF THE PREFERRED EMBODIMENTS

Figure 1:
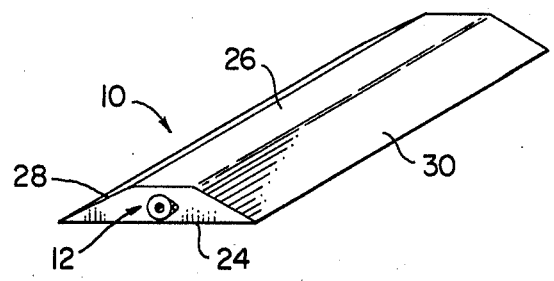
FIG. 1 is a perspective view of a cable assembly in accordance with the invention.
Figure 2:
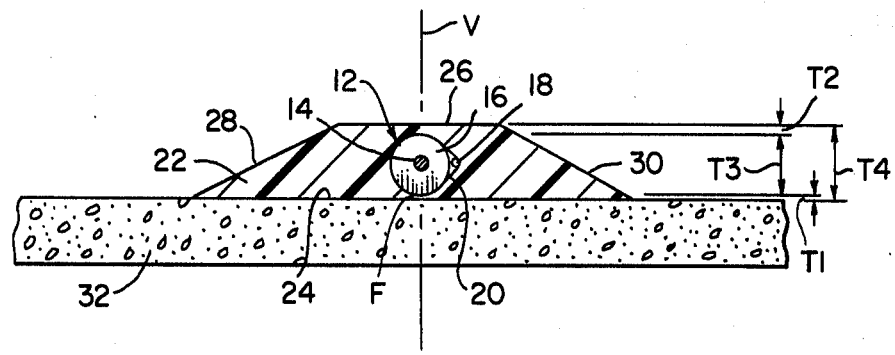
FIG. 2 is a typical transverse sectional elevation of the FIG. 1 cable assembly, shown on a concrete floor.

Referring to FIGS. 1 and 2, cable assembly 10 includes a microcoaxial cable subassembly 12, inclusive of a center conductor 14, annular electrical insulator 16, a drain wire 18 and an electrically conductive sheath 20. Such subassembly is commercially available with a protective exterior layer (not shown), for example, as microcoaxial cable BTX-30-8085 from Berk-Tek, Reading, Pa. In this commercial form, the cable is provided for use in protected environments, e.g., consoles, harnesses in metal ducts, and like customary raceway structures. As such, the product, although exhibiting dimensions compatible with undercarpet use from an aesthetic viewpoint, does not meet the mechanical abuse aspects of such undercarpet environment. The most severe of such mechanical abuse arises in the course of system installation jointly with power distribution cable, such as is shown in U.S. Pat. No. 4,219,928, issued on Sept. 2, 1980 and commonly assigned with the subject application. Often in these installations, different classes of tradespersons work on separate days and the situation may occur where the system is completely installed by electricians and remains, without benefit of overlying carpet tiles, until carpet installers may arrive. During this time period, particularly in new construction or structures being renovated, heavily loaded carts may move through the area and would then roll over the unprotected and quite delicate commercially available product, which would be subjected to abrasion and crushing forces thereby.

In providing the requisite degree of accommodation of crushing force and abrasion and, at the same time, providing a cable assembly of proper height profile and having a releasable feature, an electrically insulative resilient body 22 circumscribes subassembly 12 and imposes radial retention forces thereon throughout the length of the subassembly, the height disposition of the subassembly in the body and non-adherent surface conditions permitting such releasability. To reach this relation of characteristics, one preferably selects polyvinyl chloride (PVC) to constitute body 22, extrudes the same upon subassembly 12, the subassembly being disposed closely adjacent the floor of the extruding die. As the PVC shrinks upon the subassembly in the process, a thin retention film is defined immediately below the cable subassembly. Further, selected surfaces of the subassembly and the material constituting body 22 are chosen to be mutually non-adherent, such that no surface bond exists therebetween. In the preferred selection of materials, sheath 20 is constituted of aluminized polyester film (Mylar, trademark of du Pont) and PVC is selected as the material defining body 22.

Figure 3:
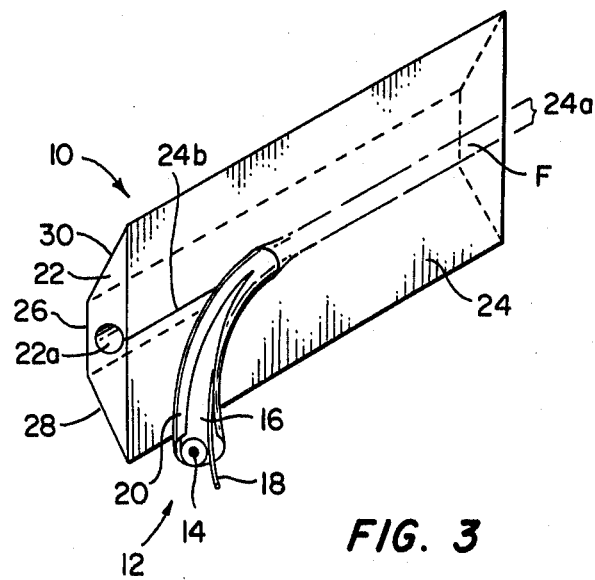
FIG. 3 illustrates the underside of the FIG. 1 cable assembly in a perspective view wherein the cable assembly is rotated ninety degrees counterclockwise from its FIG. 1 orientation.

Considering body 22 as upstanding, for reference purposes, a further feature attending cable assembly construction in accordance with the invention involves disposition of circumscribing expanse of body 22 radially of subassembly 12 to facilitate relative ease of exit of the subassembly vertically of body 22. Referring jointly to FIGS. 2 and 3, body 22 defines the aforementioned film F of material below subassembly 12, film thickness T1 being a first expanse of body 22 along vertical axis V outwardly below the subassembly less than thickness T2, a second expanse of body 22 material outwardly above the subassembly along axis V. Thus, cable subassembly diametric expanse T3 occupies the vast part of the vertical thickness T4 of cable assembly 10, giving rise to the desired low profile for aesthetics. Additionally, a major part, and preferably the entire circumferential expanse, of sheath 20 is contiguously engaged by body 22. The circumscribing expanse of body 22 material is radially greater, from about seven o'clock clockwise through to about five o'clock, than it is clockwise from about five o'clock to about seven o'clock. Thus, over approximately a three hundred degree course with respect to subassembly 12, body 22 has thickness exceeding thickness T1.

Cable assembly 10 is preferably of trapezoidal section, including a base 24, ceiling 26 and sidewalls 28 and 30 tapering downwardly outwardly to floor 32, shown as concrete, upon which the installation is to be made. In typical nominal measures, T1 is 0.001, T2 is 0.005, T3 is 0.062 and T4 is 0.068 inch.

Installation and termination of cable assembly 10 will be understood from FIG. 3 wherein its base 24 is shown in vertical disposition for purposes of explanation. Rightwardly, cable subassembly 12 is shown seated within body 22, base 24 having sufficient translucency over expanse 24a, in which area body 22 defines film F, that the seated cable may be discerned through the film. Leftwardly in FIG. 3, the cable subassembly is shown released from and protruding outwardly of body 22. To reach the released condition, a person may apply the thumbs to sidewalls 28 and 30 and the index fingers to base 24 aside expanse 24a at an end of the cable assembly. By now pinching the respective thumb and index finger on each hand and applying force to buckle ceiling 26, one parts base 24 essentially along line 24b in film F. Cable subassembly 12 emerges from body 22 through the parting action. As will be seen in FIG. 3, interior body surface 22a exhibits intactness, as its smoothness is not affected by cable subassembly release based on the above-noted selection of materials of body 22 and sheath 20 to be mutually non-adherent. Body 22 may be cut flush with the extent of cable subassembly stripped. Sheath 20 is removed from the exposed cable subassembly extent and electrical connections are made to conductor 14 and drain wire 18. A particularly preferred termination is made by use of electrical connector apparatus set forth in U.S. patent application of applicant, Ser. No. 06,213,310, filed on even date and commonly assigned herewith.

Figure 4:
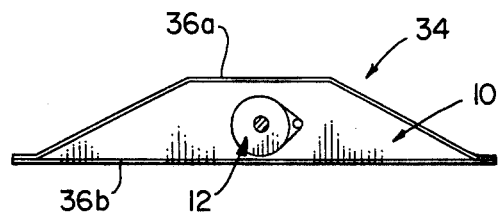
FIG. 4 is an end view of a modified version of the FIG. 1 cable assembly.

Referring now to FIG. 4, cable assembly 34 is inclusive of above-discussed cable assembly 10 of FIGS. 1–3 and further includes an exterior covering 36 of Mylar, preferably provided in plural sheets 36a and 36b. Upper sheet 36a is contiguous with ceiling 26 and sidewalls 28 and 30 and is bonded thereto, as by an adhesive coating on the undersurface of sheet 36a. Sheet 36b, on the other hand, is in non-adhered relation to base 24, i.e., no bond is established therebetween. At its sideward margins outwardly of base 24, sheet 36b is in facing relation to sheet 36a and is adheringly secured thereto, as by the adhesive coating on the undersurface of sheet 36a. By this arrangement, one may cut jointly through layers 36a and 36b immediately outward of opposite side margins of base 24, thereby releasing sheet 36b from cable assembly 34 under that extent of base 24 through which it is desired to strip cable subassembly 12. The remainder of cable assembly 34 remains with layers 36a and 36b secured thereto.

Figure 5:
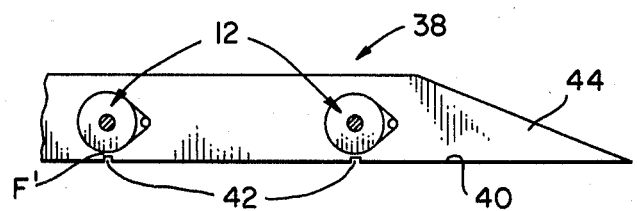
FIGS. 5, 6 and 7 are end views of further cable assemblies in accordance with the invention.

A further version 38 of cable assemblies in accordance with the invention is shown in FIG. 5. Here, base 40 has perforations 42 in registry with retention film F' and extending through base 40 partially vertically through film F', for lessening stripping forces required for release of cable subassembly 12. As is also indicated in version 38, plural cable subassemblies 12 may be arranged in spaced transverse relation to extend longitudinally with body 44, which may be extruded simultaneously about the plural subassemblies.

A characteristic common to the cable assemblies of FIGS. 1–5, shown and discussed above in connection with FIG. 3 is a translucency in registry with the cable subassembly longitudinally of the base of the retention body. In this connection, the preferred material constituting the retention body is PVC, which exhibits opacity with thickness increase. This characteristic of PVC, as suitably loaded with colorants, permits a further identification parameter for thicknesses of films F and F'. Thus, where translucency of the film permits distinction of the seated cable subassembly against an otherwise opaque base, film thickness is of measure providing a suitable compromise between retention and stripping forces.

Figure 6:
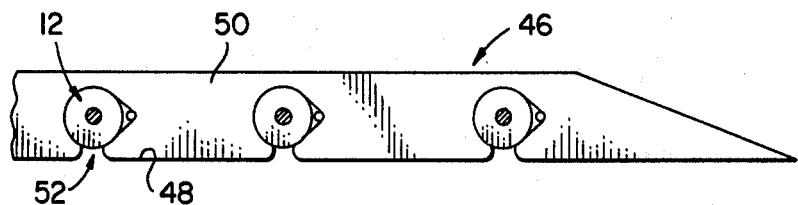
Figure 7:
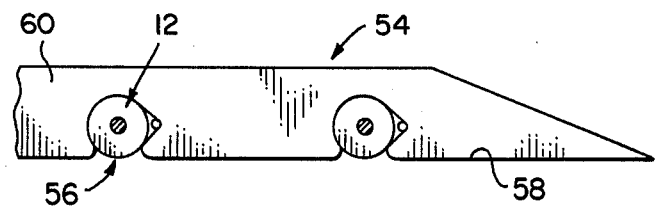

FIGS. 6 and 7 depict further embodiments of cable assemblies in accordance with the invention. In cable assembly 46 of FIG. 6, base 48 of retention body 50 defines channels 52 extending fully vertically into communication with cable subassembly 12 and of width transversely in FIG. 6 of measure substantially less than the diameter of annular insulation 16. Channels 52 are continuous interiorly of body 50 with retention surface thereof extending on the order of three hundred degrees contiguously with sheath 20. In FIG. 7, cable assembly 54 has channels 56 extending through base 58 of body 60. Here, cable subassembly 12 is positioned by body 60 such that a portion of the sheath is situated in the plane of base 58.

The invention contemplates that sheath 20 of the cable subassemblies may be left in the retention body in the course of cable subassembly release. In this aspect, the sheath may be of heat-activatable adhesive character and thus adherable to the retention body in the course of extruding same. The cable central conductor and annular insulation and drain wire are now permitted removal from the retention body by stripping same, shearing both the films F or F' and sheath contiguous with the films.

Various changes and modifications of the foregoing particularly disclosed embodiments of the invention will now be evident to those skilled in the art. Accordingly, the depicted and discussed preferred embodiments are intended in an illustrative and not in a limiting sense. The true spirit and scope of the invention is set forth in the following claims.

What is claimed is:

1. An electrical cable assembly comprising:

(a) a coaxial cable subassembly including a central electrical conductor, an electrical insulator concentric with said central conductor and an electrically conductive sheath encircling said insulator; and (b) a resilient body of electrically insulative material contiguously engaging said sheath over at least a major part of the circumference of said sheath and imposing radial retentive force upon said subassembly, said body having a first expanse in one direction radially outwardly of said subassembly along an axis intersecting said central conductor less than a second expanse of said body radially outwardly of said subassembly along said axis in a direction opposite said one direction, said body having a pair of opposed, manually deflectable sidewalls extending laterally outwardly of said axis, said first expanse defining a thin, rupturable retention film extending continuously with said sidewalls, said second expanse defining a deformable wall continuous with said sidewalls and about which said sidewalls are deflectable, said sidewalls being adapted to apply sufficient force to said thin retention film to rupture same upon manually deflecting said sidewalls about said deformable wall, whereby said coaxial cable subassembly may be released from said body through said ruptured film.

2. The cable assembly claimed in claim 1 wherein said body includes said insulative material in both said first and second expanses thereof.

3. The cable assembly claimed in claim 2 wherein said body is upstanding, defining a ceiling and a base vertically opposite said ceiling, both said base and said ceiling being intersected by said axis, said opposed sidewalls tapering downwardly outwardly from said ceiling to said base.

4. The cable assembly claimed in claim 3 further including an electrically insulative covering upon the exterior of said body, said covering being in adhered relation to said ceiling and said sidewalls and in non-adhering relation to said base.

5. The cable assembly claimed in claim 4 wherein said covering is comprised of first and second sheets, said first sheet being in adhered relation to said ceiling and said sidewalls and having ends extending beyond said sidewalls, said second sheet being in facing relation to said base and having ends extending therebeyond and in adhered relation with said ends of said first sheet.

6. The cable assembly claimed in claim 2 wherein said major part of said sheath circumference comprises the entire circumferential expanse of said sheath.

7. The cable assembly claimed in claim 6 wherein said entire circumferential expanse of said sheath is in non-adhered relation to said body.

8. The cable assembly claimed in claim 7 wherein said subassembly further includes a drain wire interiorly of said sheath.

9. The cable assembly claimed in claim 6 wherein said entire circumferential expanse of said sheath is in adhered relation to said body, said sheath being shearable to permit removal of said central conductor and said insulator therefrom.

10. The cable assembly claimed in claim 1 wherein said first expanse of said body is translucent, said subassembly being discernible through said first expanse.

11. The cable assembly claimed in claim 1 wherein said body comprises an extruded member.

12. The cable assembly claimed in claim 1 wherein said body and said sheath are comprised of materials mutually non-adherent.

13. The cable assembly claimed in claim 12 wherein said body comprises an extruded member.

14. The cable assembly claimed in claim 13 wherein said body is comprised of polyvinyl chloride.

15. The cable assembly claimed in claim 14 wherein said sheath is comprised of a polyester resin.

16. The cable assembly claimed in claim 15 wherein said sheath is comprised of aluminized polyester resin.

* * * * *